United States Patent
Hassan et al.

(10) Patent No.: US 9,877,528 B2
(45) Date of Patent: Jan. 30, 2018

(54) HIGHLY ABSORBANT FOAMED LINING

(71) Applicant: Ansell Healthcare Products LLC, Iselin, NJ (US)

(72) Inventors: Noorman bin Abu Hassan, Shah Alam (MY); Muhammad Ishkandar bin Abdul Hamid, Shah Alam (MY); Neoh Siew Bee, Shah Alam (MY)

(73) Assignee: Ansell Healthcare Products LLC, Iselin, NJ (US)

( * ) Notice: Subject to any disclaimer, the term of this patent is extended or adjusted under 35 U.S.C. 154(b) by 610 days.

(21) Appl. No.: 13/875,515

(22) Filed: May 2, 2013

(65) Prior Publication Data

US 2013/0291283 A1 Nov. 7, 2013

Related U.S. Application Data

(60) Provisional application No. 61/641,696, filed on May 2, 2012.

(51) Int. Cl.
*B29C 44/06* (2006.01)
*A41D 19/00* (2006.01)
*B29L 31/48* (2006.01)
*B29C 44/34* (2006.01)

(52) U.S. Cl.
CPC ..... *A41D 19/0006* (2013.01); *A41D 19/0058* (2013.01); *B29C 44/06* (2013.01); *B29C 44/3492* (2013.01); *A41D 2400/60* (2013.01); *B29L 2031/4864* (2013.01); *Y10T 428/249953* (2015.04)

(58) Field of Classification Search
CPC .............................................. B29L 2031/4864
See application file for complete search history.

(56) References Cited

U.S. PATENT DOCUMENTS

| 4,329,312 A * | 5/1982 | Ganz .................... A61B 19/04 |
| | | 2/168 |
| 4,362,773 A | 12/1982 | Shikinami |
| 4,668,323 A | 5/1987 | Lenards et al. |
| 6,143,416 A * | 11/2000 | Brindle et al. ............. 428/423.1 |
| 7,048,884 B2 * | 5/2006 | Woodford et al. ........... 264/255 |
| 7,244,489 B2 | 7/2007 | Owensby |
| 7,390,374 B2 | 6/2008 | Moning et al. |
| 7,771,644 B2 * | 8/2010 | Flather et al. ................ 264/307 |
| 8,387,167 B2 | 3/2013 | Matsunobu et al. |

(Continued)

FOREIGN PATENT DOCUMENTS

| CN | 1090863 A | 8/1994 |
| CN | 1812730 A | 8/2006 |

(Continued)

OTHER PUBLICATIONS

Tony Whelan, Polymer Technology Dictionary, 1994, Chapman and Hall, 1rst edition, 270.*

(Continued)

*Primary Examiner* — Jeff Wollschlager
*Assistant Examiner* — Armand Melendez
(74) *Attorney, Agent, or Firm* — Moser Taboada

(57) ABSTRACT

Provided in one embodiment is a cured absorbent composite comprising: liquid resistant layer of elastomer; and a layer affixed to the liquid resistant layer comprising an open foam of elastomer, wherein the moisture absorption capacity of the foam layer, normalized by the thickness of the absorptive layer, is 1.5 times that of Ansell's foam lined Household glove.

7 Claims, 5 Drawing Sheets

(56) References Cited

U.S. PATENT DOCUMENTS

| | | | |
|---|---|---|---|
| 2003/0090037 A1* | 5/2003 | Woodford | B29C 41/003 |
| | | | 264/331.13 |
| 2007/0148432 A1 | 6/2007 | Baker et al. | |
| 2007/0204381 A1 | 9/2007 | Thompson et al. | |
| 2011/0099689 A1* | 5/2011 | Taylor et al. | 2/167 |
| 2011/0309541 A1* | 12/2011 | Thompson et al. | 264/46.6 |
| 2015/0272245 A1* | 10/2015 | Khor | A41D 31/0016 |
| | | | 2/21 |

FOREIGN PATENT DOCUMENTS

| | | |
|---|---|---|
| EP | 0425270 A2 | 5/1991 |
| EP | 2020427 A1 | 2/2009 |
| JP | 2011-255613 A | 12/2011 |

OTHER PUBLICATIONS

Zeon Corporation, 2009.*
International Search Report and Written Opinion dated Aug. 14, 2013 for Application No. PCT/US2013/038762.
Extended European Search Report dated Jan. 19, 2016 for Application No. 13784825.5.
Chinese Office Action dated Jul. 18, 2016 for Application No. 201380022675.X.
Chinese Office Action dated Dec. 18, 2015 for Application No. 201380022675.X.
Australian Patent Examination Report dated Sep. 12, 2016 for Patent Application No. 2013256510.
Chinese Office Action dated Jan. 11, 2017 for Application No. 201380022675.X.

* cited by examiner

HIGHLY ABSORBANT FOAMED LINING

This application claims the priority of U.S. Ser. No. 61/641,696, filed May 2, 2012, the content of which is incorporated herein in its entirety.

Embodiments of the present invention generally relate to latex gloves, and other polymeric surfaces bondable with foam latex for which high moisture absorbance would be useful. More specifically, embodiments of the invention relate to moisture absorptive gloves.

Users of latex glove are often discomforted by the buildup of sweat in the gloves. This can lead to repeated, otherwise unnecessary, discards of gloves. It is known to address this issue with liners made of foam latex. U.S. Pat. No. 7,048,884 (Woodford et al.) presents an advance in moisture absorbency whereby a highly porous open-cell foam is made. Provided herein is a method that applies a foam latex formulated to form a foam with substantial closed-cell structure, but further mechanically induces an open cell structure of good absorbency. Also provided is the glove with such good absorbency.

This application relates for example to making a glove (e.g., industrial) from synthetic lattices that are dipped into or otherwise coated with a highly absorbent foam compound (the glove, for example, built onto a hand-shape mandrel). The foam will then be subjected to flocking or blowing fiber (e.g., natural cotton) through air onto the foam compound to create a unique open-celled structure. In another embodiment, a reversed dipping or coating process uses a rough textured former or bisque former that is coated with a foam latex compound before applying the main, liquid resistant layer to create a similar unique open-celled structure.

SUMMARY OF THE INVENTION

Embodiments of the present invention generally relate to a cured absorbent composite comprising: liquid resistant layer of polymer; and a layer affixed to the liquid resistant layer comprising an open foam of elastomer, wherein the moisture absorption capacity of the foam layer, normalized by the thickness of the absorptive layer, is 1.5 times or more that of Ansell's foam lined Household glove (as sold in April, 2012). The composite can be formed in the shape of a glove, generally with the foamed layer adapted to be adjacent to the user's hand.

Another embodiment relates to a method of forming a highly absorbent composite comprising: forming a layer of foamed elastomer; mechanically converting the layer of foam elastomer from a foam structure including closed cell structure to a substantially more open cell structure; forming a layer of unfoamed polymer either prior to or after forming the foamed layer, wherein the unfoamed and foamed layers are integrally affixed to one another; and curing the foamed layer. In embodiments, mechanically converting the layer of foam is effected by forming the foamed layer by dipping a former with a rough surface into foamed elastomer, the rough surface effective to so convert the foamed layer. In embodiments, mechanically converting the layer of foam is effected by applying a fibrous flock to the layer. In embodiments, mechanically converting the layer of foam is effected by applying to the foam layer micronized waxes, fillers, cationic starch powders, salt particles, solidified acid particles, atomized coagulant salts or acids, or the like.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
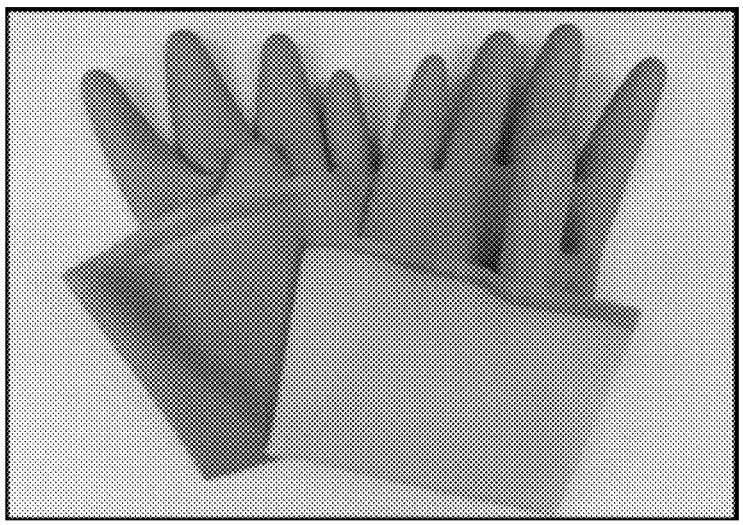
FIG. 1 shows gloves made according to the invention. One glove has the cuff turned inside out to show the lining according to the invention.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. The word "glove" means glove or glove liner.

DETAILED DESCRIPTION

Embodiments of the present invention comprise a polymeric (e.g., latex) glove with a highly absorbent liner layer.

In embodiments, the moisture absorption capacity of the foam layer, normalized by the thickness of the absorptive layer, is 1.5 times or more that of Ansell's foam lined Household glove (as sold in the U.S. in April, 2012). In embodiments, it is 2.0 times or more, or 2.5 times or more, or 3.0 times or more, or 3.5 times or more.

In embodiments utilizing NBR as the moisture resistant layer, the moisture absorption capacity of the foam layer, normalized by the thickness of the absorptive layer, is 5 times or more that of Ansell's Solvex Flocklined glove (as sold in the U.S. in April, 2012). In embodiments, it is 6 times or more, or 7 times or more, or 8 times or more, or 9 times or more, or 10 times or more.

In embodiments, the moisture absorption capacity of the foam layer, normalized to a thickness of 0.13 mm for the absorptive layer (measured by the foam latex, not any flock), is about 0.3 $g/dm^2$ or more, or about 0.4 $g/dm^2$ or more, or 0.5 $g/dm^2$ or more. In embodiments, normalized to a thickness of 0.19 mm for the absorptive layer, the moisture absorption capacity of the foam layer is about 0.7 $g/dm^2$ or more. In embodiments, normalized to a thickness of 0.25 mm for the absorptive layer the moisture absorption capacity of the foam layer is about 0.9 $g/dm^2$ or more. In embodiments, normalized to a thickness of 0.275 mm for the absorptive layer, the moisture absorption capacity of the foam layer is about 0.6 $g/dm^2$ or more, or about 0.8 $g/dm^2$ or more, or 1.0 $g/dm^2$ or more, or about 1.1 $g/dm^2$ or more, or about 1.2 $g/dm^2$ or more, and so forth. In embodiments, normalized to a thickness of about 0.350 mm for the absorptive layer, the moisture absorption capacity of the foam layer is about 1.5 $g/dm^2$ or more, or about 1.6 $g/dm^2$ or more, or about 1.7 $g/dm^2$ or more and so forth. In embodiments, the thickness is between about 0.275 to about 0.350 mm for an absorptive capacity of between about 1.0 to about 1.5 $g/dm^2$. In embodiments, normalized to a thickness of 0.275 mm for the absorptive layer, the moisture absorption capacity of the foam layer is about 1.3 $g/dm^2$ or less.

By "mechanically converting the layer of foam elastomer from a foam structure including closed cell structure to a substantially more open cell structure" it is meant that the foam, on curing, is substantially more absorbent than would apply in the absence of the mechanical conversion. In embodiments, the foamed elastomer used to form the foamed layer is adapted to, on curing, form a sufficiently closed cell structure that moisture absorbency is about 50% or more lower than it would be with the mechanical conversion. In embodiments, the foamed elastomer used to form the foamed layer is adapted to, on curing, form a sufficiently closed cell structure that moisture absorbency is about 50% or more lower than it would be with the mechanical conversion using a roughened former. Or, moisture absorbency is about 60% or more lower than it would be with the mechanical conversion using flock. These improvements compared to a lack of mechanical conversion indicate substantial closed cell structure prior to mechanical conversion.

The elastomeric layers may be natural rubber latex (including Guayule latex), synthetic rubber latex, or the like, and combinations thereof. The synthetic rubber latex may be selected, for example, from the group comprised of polychloroprene, acrylonitrile butadiene copolymer (NBR) (such as carboxylated acrylonitrile butadiene copolymer), polyisoprene, polyurethane, styrene-butadiene, butyl, and combinations thereof.

In embodiments, the elastomer for the moisture resistant or foamed layer is predominantly NBR (50% or more). In embodiments it is substantially (90% or more by weight) NBR.

In embodiments, one or more of the polymer layers that are a moisture resistant layer have density consistent with aqueous latex dipping (as opposed for example to a density consistent with injection molding). In embodiments, the moisture-resistant layers have other properties (such as elasticity) consistent with aqueous latex dipping. These densities or other properties can vary with the polymer content of the elastomeric layers.

In one embodiment, the elastomeric layer(s) may have commonly used stabilizers such as potassium hydroxide, ammonia, sulfonates and the like. In one embodiment, the elastomeric layer(s) may contain other commonly used ingredients such as surfactants, anti-microbial agents, fillers/additives and the like. In one embodiment, the elastomeric polymer composition used to form the moisture resistant layer has a viscosity in the range of 2000-3000 centipoises.

The foam compound formulation can comprise elastomer, curative agent and foaming agent, and optionally one or more of thickening agent (e.g., MHPC), flow modifier, pigment(s), and the like. Wax or filler additives may be added. Foaming process carried out mechanically by whipping the compounded compound until desired foam properties such as density and viscosity are obtained. In embodiments, thickener is used to bring the viscosity of the formulation (upon foaming) to 250 cps (60 rpm) or higher, or 300 cps or higher, or 350 cps or higher, or 400 cps or higher. In embodiments, viscosity is kept under 700 cps, or 600 cps, 500 cps, or under 450 cps. In one embodiment a latex formulation for forming the foamed absorptive layer contains latex (e.g., NBR), potassium hydroxide salt, flow modifier, foaming agent (sodium dodecylbenzene sulfonate), curative agent, pigment, cellulosic thickener and water.

For NBR formulations, acrylonitrile content can in embodiments be for example about 28-42%, about 28-34%, or about 35-37%, or about 38-42% (by wt). For the interior process, about 38-42% is for example a useful content. For the exterior processes, about 28-37% or about 28-34% acrylonitrile content is for example useful.

In embodiments, the elastomeric for the foamed layer is foamed using well-dispersed air cells, forming a structure including closed cells. Once the elastomeric coating is foamed with the right air content and the viscosity is adjusted, refinement of the foam is undertaken for example by using the right whipping impeller stirrer driven at an optimal speed first and the air bubble size is refined for example using a different impeller run at a reduced speed. Foaming process can be carried out mechanically by whipping the compounded formulation/compound until the desired foam properties such as density and viscosity are obtained.

In certain embodiments, foam density is about 30% or higher, or about 35% or higher, or about 40% or higher. In embodiments, foam density is about 80% or lower, or about 70% or lower, or about 60% or lower, about 55% or lower, or about 50% or lower, or about 45% or lower. For the interior process, one useful range is about 50-60% density with a viscosity of about 450-500 cps. For the exterior process, one useful range is about 40-45% density with a viscosity of about 400-450 cps.

In embodiments, the foam is applied by spraying. In embodiments, the foam is applied by dipping.

In embodiments, coagulant solution (e.g., 2-10 wt % calcium nitrate aqueous solution) is applied to the former or a elastomer layer and dried prior to application of an elastomeric layer or a subsequent elastomer layer. In embodiments, the former is not treated with coagulant prior to dipping a rough-surfaced former into foamed elastomer. In embodiments, the liquid resistant layer of elastomer is not treated with coagulant prior to dipping into foamed elastomer. In embodiments, the liquid resistant layer of elastomer is leached with water (such as, for example, 40° C. water) prior to dipping into foamed elastomer.

When applying a liquid resistant layer or a foamed layer to a former, a gellied coagulant can be used to act as an adhesive for the latex to adhere to the former. It contains for example calcium nitrate, wetting agent (alcohol ethoxylate and/or alkylarylalkoxylate), cellulosic thickener, water-based defoamer and water. The formulation can be designed to have few wetting agents in order to have optimum former wetness to minimize potential of major defects such as holes and thin spots. The defoamer functions as a bubble inhibitor.

The liquid resistant layer can be a thick film, such as between about 10-20 mil (single-walled thickness) that provides protection against liquid permeability. It can be made for example of latex (e.g., NBR), potassium hydroxide salt, flow modifier (e.g., styrene-mono secondary butyl maleate-monomethyl maleate-maleic anhydride polymer), curative agents, germicide, pigments and water. A liquid resistant layer can be formed of one, two or more latex dipping steps.

After forming the liquid resistant layer or a foamed layer, a primer coagulant can be applied prior to applying an exterior layer. The primer coagulant's function is similar to gellied coagulant but optional. A basic formulation could contain calcium nitrate, wetting agent (e.g., alkyl trimethylammonium bromide) and water.

The flocking process can be carried out conventionally by utilizing flock booth to blow and suspend the fiber in the air, and allowing it to gradually fall and adhere onto a foam-dipped former. Flock can be cotton fiber or other fiber such as rayon, bamboo or the like.

In embodiments, flock is for example 0.01 (or 0.02) to 0.3 (or 0.1, or 0.2) mm in length. In embodiments, the thickness of the foamed layer is for example 0.01 (or 0.02) to 0.3 (or 0.1, or 0.2) mm.

In the process utilizing a former with a rough surface, the un-foamed (i.e., solid) elastomer of the outer polymer layer, or the foamed or unfoamed elastomer a second (or further) outer layer can be given a texture to assist in gripping. For example, the process described in U.S. Pat. No. 7,771,644 can be used (which patent is incorporated by reference herein in its entirety). The process can be achieved by dipping straight the rough (e.g., bisque unglazed former, AlphaTEC APTformer) into a foamed nitrile compound, which creates (near instantaneously) an open-celled structure on the contacting surfaces of the former.

The rough surface can be created by applying an adhesive (e.g., water-soluble polymer adhesive, such as without limitation polyvinylidine prollidione (PVP)) in or in conjunction with a coagulant primer onto a smooth former surface and then spraying on particles, such as salt, PE, PP, and the like (which can be for example micronized particles).

Roughness measures for three formers useful in the interior method are as follows:

| Parameters | Type of Former | | |
|---|---|---|---|
| | Z51 (former from MIM) | AlphaTec | HWT Solvex |
| Ra | 4.031 µm | 7.257 µm | 10.77 µm |
| Rz | 24.6 µm | 36.7 µm | 47.6 µm |
| Rmax | 26.1 µm | 43.6 µm | 69.4 µm |

| Parameters | Type of Former | | |
|---|---|---|---|
| | Z51 (former from MIM) | AlphaTec | HWT Solvex |
| Rp | 12.9 µm | 19.9 µm | 25.6 µm |
| Rv | 11.7 µm | 16.8 µm | 22.1 µm |
| RPc | 80 | 60 | 33 |

Legend:
1) Roughness average, Ra- the arithmetic average of the absolute values of the roughness profile ordinates.
2) Mean roughness depth, Rz- the arithmetic mean value of the single roughness depth of consecutive sampling length.
3) Maximum roughness depth, Rmax- the largest single roughness depth within the evaluation length.
4) Peak height, Rp- the height of the highest profile peak of the roughness profile within one sampling length.
5) Valley height, Rv- Depth of the deepest profile valley within one sample length.
6) Peak count, Rpc- Number of roughness profile elements per cm, which consecutively intersect the specified upper profile section C1 and lower profile section C2 (See ISO 4287 and Perthometer, Surface Texture Parameters: New Standards KIN EN ISO/ASME, MAHR GMBH, Germany, 1999, the contents relevant to ISO 4287 measurements incorporated by reference).

The roughness of the formers was measured using test method available in S&T quality system (TM.028 Determination of Coating Thickness and Surface Roughness Properties (Rev0), methodology based on ISO 4287). Thus, in embodiments, the interior method uses a former with a Ra of about 3 micron or more, such as about 4 micron or more, and so forth, including about 9 micron or more. In embodiments, the Ra is 11 micron or less. In embodiments, the interior method uses a former with a Rz of about 20 micron or more, about 25 micron or more, and so forth including about 40 or about 45 micron or more. In embodiments, the Rz is about 47 micron or less. In embodiments, the interior method uses a former with a RPc of about 20 or more. In embodiments, the interior method uses a former with a RPc of about 120 or less. In embodiments, any combination of two or more of the recited parameter boundaries for Ra, Rz or RPc applies.

Figure 4:
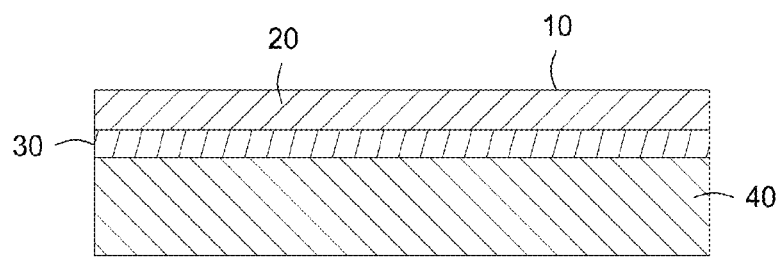
FIG. 4 shows a cross-section that utilizes an intermediate layer.

The process as outlined focuses on a foamed layer and a moisture resistant layer to which it is adhered. It will be recognized that there can be additional layers, such as additional moisture resistant layer(s) or a layer utilized to provide an external textured surface. Moreover, the foamed and moisture resistant layers may be adhered via an intermediate elastomer layer, such as illustrated in FIG. 4. The intermediate elastomer layer can include a contamination indicator, such as taught in PCT/US11/48589 (which application is incorporated herein by reference in its entirety).

Figure 2:
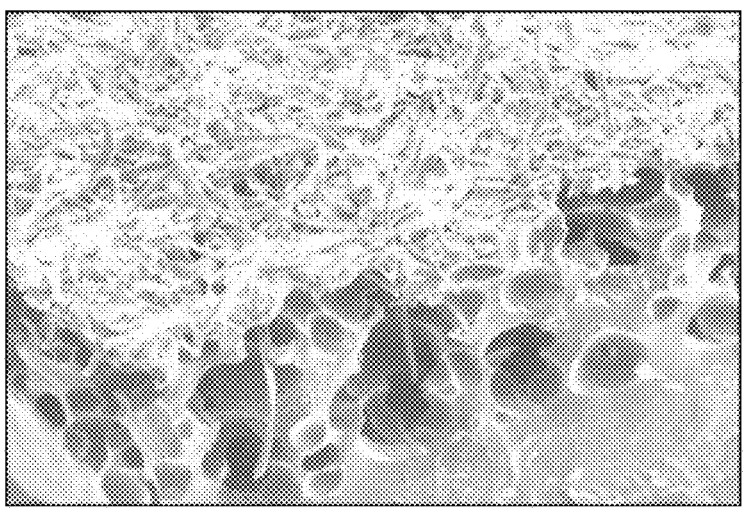
FIG. 2 shows an SEM image of a lining according to the invention, formed with the exterior process, from a perspective angle showing a cut edge of a composite.
Figure 10:
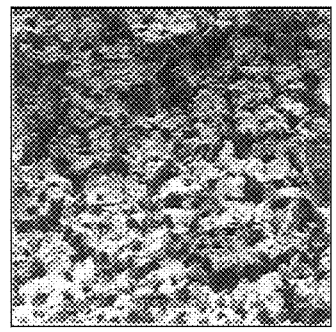
FIG. 10 shows the open pores (SEM photograph, top view) formed on the surface of the composite formed with the exterior process.

As can be seen in FIGS. 2 and 10, the flock fibers are effective to penetrate the foam layer, and thereby further open the cells of the foam layer.

Figure 3:
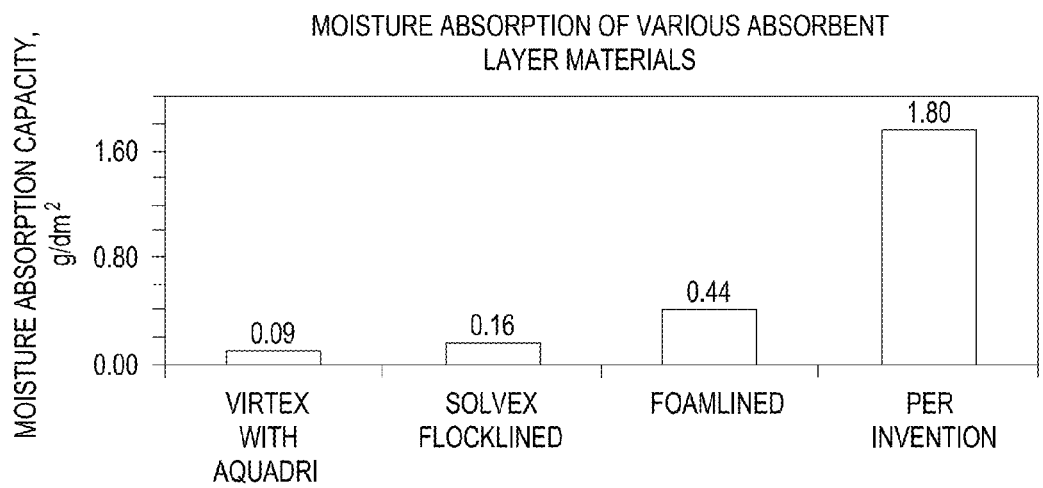
FIG. 3 shows the absorbency of a lining of the invention (wherein the foam is opened with flock), as compared to other high absorbency liners.

FIG. 3 compares moisture absorption capacity of glove of the invention, and Ansell Virtex™, Ansell Solvex™ Flock-lined and Ansell Foam Lined Household gloves.

The elastomeric coating is breathable preventing the glove from becoming clammy. In one embodiment, an aqueous fluorochemical dispersion coating may be applied to the glove to further prevent liquid from penetration. The aqueous fluorochemical dispersion comprises an aqueous solvent medium to form a coating that is typically 0.5 to 2 micron in thickness. The aqueous fluorochemical dispersion may also be applied to a glove with unfoamed elastomeric coating to prevent oil or water penetration through occasional imperfections in the elastomeric coating. Methods for incorporating high air contents into elastomer foams are described in Woodford et al., U.S. Pat. No. 7,048,884, which is incorporated herein in its entirety.

A. Exterior Process

Figure 5:
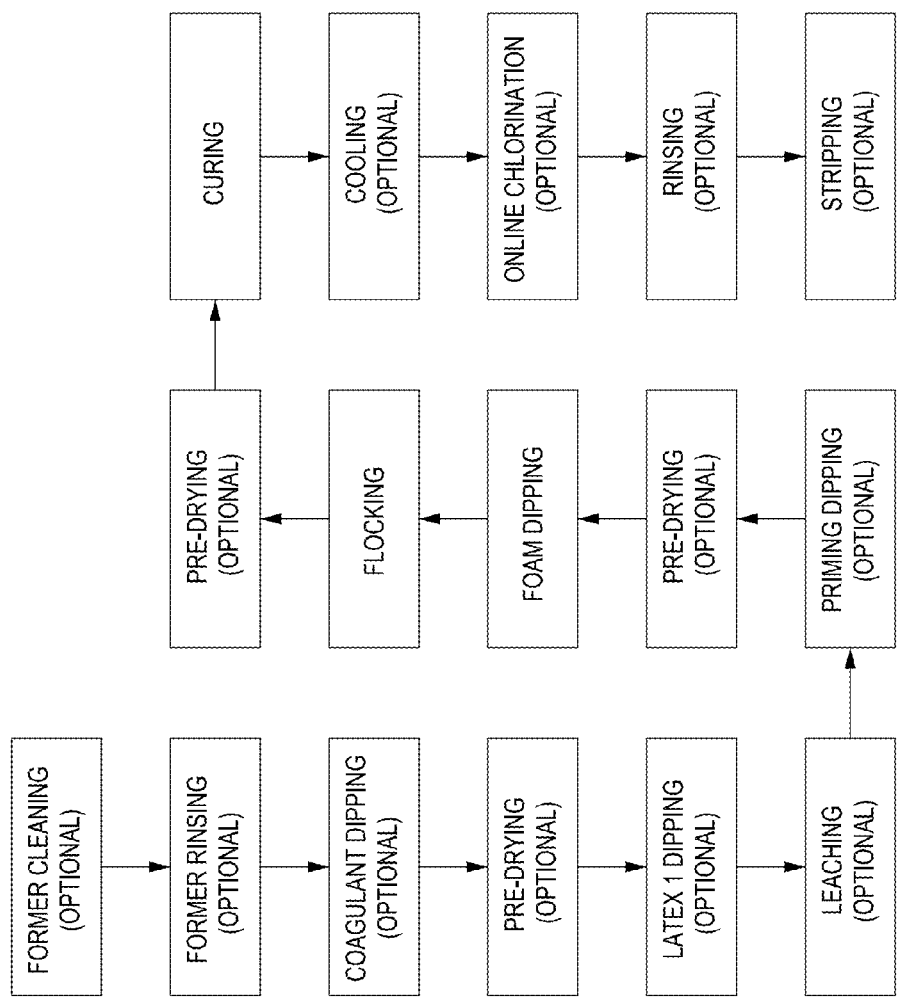
FIG. 5 shows an exemplary mechanical conversion process wherein the conversion is applied to a top layer of foam.

An exemplary process applying mechanical conversion from the exterior is shown in FIG. 5. The non-optional steps are foam dipping, flocking and curing. FIG. 4 shows an illustrative cross-section, with flock 10, foam layer 20, optional chemical indicator layer 30, and shell layer 40.

A1. Dipping Process

In one embodiment, the liquid resistant layer is formed by a dipping process. The process can start with former cleaning using acid solution to ensure the surface is clean from any foreign particle. A rinsing process is typically carried out prior to coagulant dipping (e.g., gellied). Concentration and temperature of coagulant is controlled to ensure formation of uniform coating. Timing of former immersion, dwelling and extraction can also be controlled to minimize bubble creation. Former can be dried at ambient or heated temperature, typically with former position pointing upward to ensure free flow of coagulant and optimum film dryness prior to latex dipping. Once the former is sufficiently dried, latex dipping is started. Similar to the coagulant dipping, a number of factors are controlled within specification. Leaching process to remove excess chemical typically residual takes place after latex dip. Leach water temperature and timing is selected to ensure optimum leaching process. After leaching, former will typically undergo primer coagulant dipping before again being dried in anticipation of foam dipping. Foam properties such as the viscosity and density are locked within specification in order to get required film thickness and absorption. The foam is subjected to the flocking process. Finally, the glove can be pre-cured at ambient temperature for approximately 5 minutes before curing process started at 90-130° C. for 1-2 hours. The absorbent composite will typically undergo cooling, online chlorination and rinsing before the stripping process.

A2. Foaming Process

The foaming process is typically carried out mechanically by whipping the compounded compound until desired foam properties (foam density and viscosity) are achieved. On a laboratory scale, a high-speed stirrer can be used and the speed is typically set between 800-1600 rpm depending on targeted properties. For large scale, a foaming machine can be utilized and foam properties are set by adjusting the pump speed and mixer speed.

A3. Flocking Process

The flocking process can be carried out conventionally by utilizing flock booth to blow and suspend the cotton fiber in the air before it gradually falls and adheres onto the foam layer. This process will create an open-celled foam structure that able to absorb significant amount of moisture. It also helps to absorb moisture faster and provide comfort to the wearer. Electrostatic flocking processes can be used.

B. Interior Process

Figure 6:
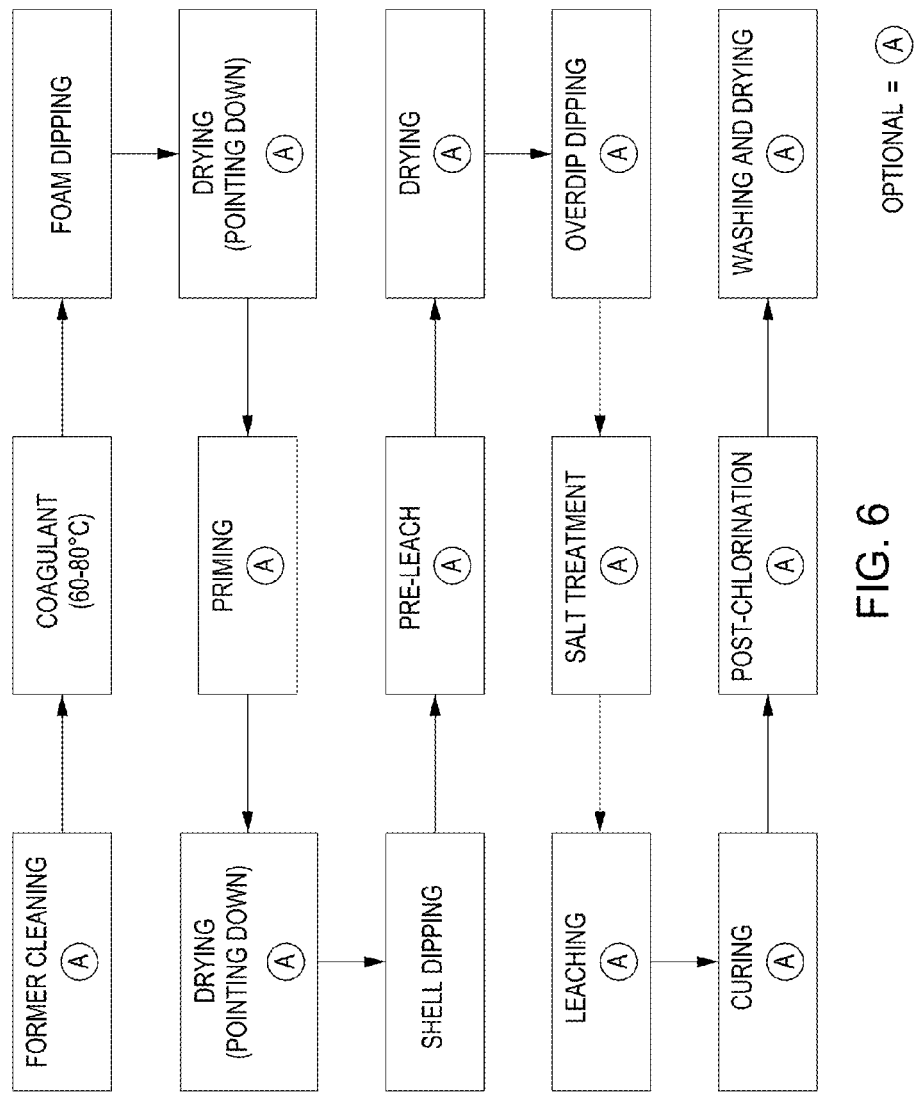
FIG. 6 shows an exemplary mechanical conversion process wherein the conversion is applied to an interior or bottom layer of foam.

FIG. 6 shows an exemplary mechanical conversion process wherein the conversion is applied to an interior or bottom layer of foam. The initial coagulant application, foam dipping and shell dipping steps are the non-optional steps.

In embodiments, the rough former is contacted with flock after coagulant dipping. In embodiments, the foam is applied by spraying. In embodiments using flock, the former is treated with a water soluble polymer binder and release agent such as Luviquat PQ11 or release agent such as PEG 400 prior to flocking. In embodiments, the former is treated with one release agent (e.g., Luviquat PQ11) prior to flocking, and another (e.g., PEG 400) after flocking but prior to application of the foam.

In embodiments, the former is treated with one water-soluble binder (Luviquat PQ 11) in a coagulant solution prior to fluidized spray application of solid non-coagulant particles such as calcium carbonate or the former is treated with one water soluble binder (Luviquat PQ 11) prior to fluidized spray application of solid water-soluble coagulant particles such as sodium chloride, sodium sulphate etc. in the initial coagulant formulation for the interior process. The non-coagulant particles can be removed by acid off-line washing process and the coagulant particles by normal off-line washing process.

In embodiments using the interior process, the former temperature is 60° C. or less, or 55° C. or less, or 50° C. or less, or 45° C. or less.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

EXAMPLE 1

Dipping process is conducted as per the sequence in FIG. 5. Typical formulation of gellied coagulant, compound base 1 and primer coagulant are as shown below. Formulation of foam is shown in Table 4. Foaming process is carried out using high-speed stirrer. The speed and timing of the process has been adjusted accordingly until desired foam properties achieved.

TABLE 1

Formulation of gellied goagulant

| % TSC | Materials | Part (w/w) |
|---|---|---|
| 78 | Calcium nitrate | 30-40 |
| 20 | Wetting agent #2 | 0.01-0.25 |
| 20 | Wetting agent #2 | 0.1-0.2 |
| 1 | Cellulosic thickener | 0.1-0.5 |
| 1 | Water-based defoamer | 0.001-0.005 |

TABLE 2

Formulation of compound base 1

| % TSC | Materials | Phr |
|---|---|---|
| 44 | Nitrile latex | 100 |
| 5 | Potassium Hydroxide | 0.1-0.5 |
| 10 | Flow modifier | 0.1-1.0 |
| 50 | Curative agent | 1.0-10.0 |
| 7.5 | Germicide | 0.1-0.5 |
| 100 | Pigment | 1.0-10.0 |

TABLE 3

Formulation of primer coagulant

| % TSC | Materials | Part (w/w) |
|---|---|---|
| 78 | Calcium nitrate | 15-25 |
| 100 | Wetting agent | 0.1-0.5 |

TABLE 4

Formulation of foam

| % TSC | Materials | Phr |
|---|---|---|
| 44 | Nitrile latex | 100 |
| 5 | Potassium hydroxide | 0.25 |
| 10 | Flow modifier | 0.20 |
| 30 | Foaming agent | 1.00 |
| 50 | Curative agent | 1.50 |
| 100 | Pigment | 0.05 |
| 6 | Cellulosic thickener | 0.50 |

Wax at 100% TSC and 0.035 Phr is an option.

Illustrative properties of each formulation/compound are shown below:

| Parameters | Gellied coagulant | Primer coagulant | Compound base 1 | Compound base 2 |
|---|---|---|---|---|
| | | Type of compound | | |
| TSC % | N/a | N/a | 38-45 | 38-45 |
| pH | N/a | N/a | 8.8-9.8 | 8.8-9.8 |
| Viscosity, cps | N/a | N/a | 18-22 | N/a |
| Concentration, % | 30-40 | 15-25 | N/a | N/a |
| Foam viscosity, % | N/a | N/a | N/a | 350-450 |
| Foam density, % | N/a | N/a | N/a | 40-50 |

EXAMPLE 2

An illustrative interior process is conducted per the process of FIG. 6 (with or without chlorination, and with and without overdip), with the following formulations:

TABLE 5

Initial Coagulant (with polyox)

| % | Chemicals | Dry (phr) | Wet (phr) |
|---|---|---|---|
| 78 | Calcium nitrate | 7 | 8.97 |
| 50 | Mesamoll | 1 | 2 |
| 1 | Polyox 301 | 0.01 | 1 |
| 100 | Water | — | 88.03 |
| | Total | | 100 |

Remark: Spray the CN with Polyox on hot former surface

TABLE 6

Foam NBR A

| % | Chemicals | Dry (phr) |
|---|---|---|
| 44 | High ACN(40%) NBR | 100 |
| 5 | KOH | 0.25 |
| 11.3 | Scripset 550 | 0.2 |
| 30 | Calsoft L60 | 1 |
| 50 | ZnO | 1.5 |
| 100 | DVM Grey Mod 2 | 0.05 |
| 6 | MPHC-50 | 0.45 |
| | Total | 103.45 |

For the second priming, one of:

TABLE 7

27% gellied Priming

| TSC | Chemicals | Dry (phr) |
|---|---|---|
| 78% | Calcium nitrate | 27 |
| 100% | TERIC 320 | 0.018 |
| 100% | SURFYNOL TG | 0.06 |
| 1.50% | CELLOSIZE SOL | 0.11 |
| 100% | DEFOAMER 1512M | 0.003 |
| 100% | water | — |
| | TOTAL | 27.191 |

TABLE 8

47% Coagulant

| TSC | Chemicals | Dry (phr) | Wet (phr) |
|---|---|---|---|
| 78% | Calcium nitrate | 47 | 60.26 |
| 100% | Water | — | 39.74 |
| | Total | 47 | 100 |

TABLE 9

Formulation of Shell

| TSC (%) | Chemicals | Dry (phr) | Wet (phr) |
|---|---|---|---|
| 45 | NBR A | 100.00 | 222.22 |
| 5 | KOH | 0.55 | 11.00 |
| 50 | COMPOSITE | 5.50 | 11.00 |
| 10 | SCRIPSET 550 | 0.50 | 5.00 |
| 7.50 | NIPACIDE TK | 0.25 | 3.33 |
| 50 | FREESIL N | 0.60 | 1.20 |
| 100 | HYDROTINT RED 187C | 4.00 | 4.00 |
| | TOTAL | 111.40 | 257.76 |

Figure 7:
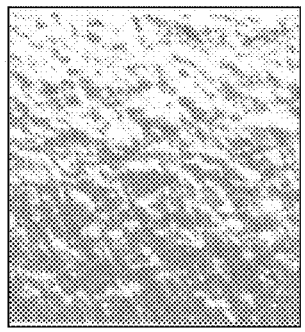
FIG. 7 shows an illustrative bisque texture of a former (top view, SEM photograph).
Figure 8:
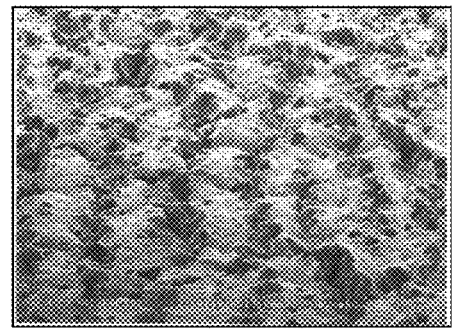
FIG. 8 shows the open pores (SEM photograph, top view) formed on the surface of the composite formed with a rough-surfaced former.
Figure 9:
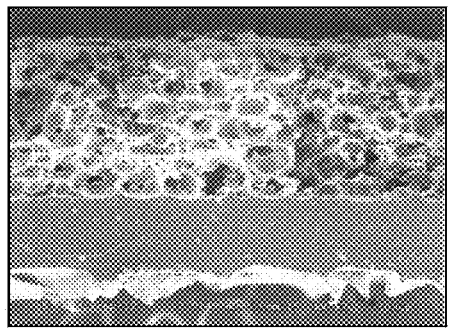
FIG. 9 shows an SEM cross section of a composite formed with a rough-surfaced former.

The former utilized had texture as shown in FIG. 7.

EXAMPLE 3

An illustrative interior process is conducted per the process of FIG. 6 (with or without chlorination) with the formulations of Example 2, and the following overdip formulation:

TABLE 14

Overdip formulation

| TSC | Chemicals | Dry (phr) |
|---|---|---|
| 45% | High ACN (40%) NBR | 100 |
| 5% | KOH | 0.55 |
| 50% | COMPOSITE A345 | 4 |

TABLE 14-continued

Overdip formulation

| TSC | Chemicals | Dry (phr) |
|---|---|---|
| 7.50% | NIPACIDE TK | 0.25 |
| 100% | DVM GREY MOD | 4 |
| 100% | HYDROTINIT BLACK 3115 | 0.5 |
| 6% | ACRYSOL G-111 | 1.2 |
| | Total | 110.5 |

Salt application for exterior texturing was according to the method of U.S. Pat. No. 7,771,644, which is incorporated herein for these teachings in their entirety. Absorbencies of the interior layer of 1.8-2.2 g/dm$^2$ are obtained.

Misc. Embodiments

A. A glove construction comprising dipping in a gellied coagulant, a NBR latex, a primer coagulant, a NBR foam latex and flock fibres.

B. A glove construction reversed to that of A comprising dipping in a coagulant dip, a NBR foam latex, a primer coagulant, a NBR latex and salt texturised thickened NBR latex.

C. A glove as recited above with foam NBR latex with open-celled structure for high absorption moisture capabilities.

D. A glove as recited above formed through impregnation of particles such as flock fibres, micronized waxes, fillers, cationic starch powders, salt particles, solidified acid particles, or atomized coagulant salts or acids to create an open-celled porous structure.

E. A glove as recited above formed through overdipping a roughened texture or bisque former into a foam NBR latex compound.

F. A glove as recited above can also be made of any other polymer latex foam compound such as Chloroprene latex, NR latex, PU latex, PI latex, Guayule and butyl latex, and the like, or their blends.

G. A glove as recited above whereby the foam latex is whipped to around 30-80% of foam density, or around 40-70%, or around 50-60%.

H. A glove as recited above that is on-line chlorinated or off-line chlorinated for ease of donning.

Embodiment 1

A cured absorbent composite comprising: liquid resistant layer of polymer; and a layer affixed to the liquid resistant layer comprising an open foam of elastomer, wherein (a) the moisture absorption capacity of the foam layer, normalized by the thickness of the absorptive layer, is 1.5 times that of Ansell's foam lined Household glove, or (b) the moisture absorption capacity of the foam layer, normalized to a thickness of 0.275 mm for the absorptive layer, is about 0.6 g/dm 2 or more.

Embodiment 2

The cured absorbent composite of embodiment 1, wherein the moisture absorption capacity of the foam layer, normalized by the thickness of the absorptive layer, is 1.5 times that of Ansell's foam lined Household glove.

Embodiment 3

The cured absorbent composite of embodiment 1 or 2, wherein the moisture absorption capacity of the foam layer, normalized to a thickness of 0.275 mm for the absorptive layer, is about 0.6 g/dm 2 or more.

Embodiment 4

The cured absorbent composite of embodiment 1 or 2, wherein the moisture absorption capacity of the foam layer, normalized to a thickness of 0.275 mm for the absorptive layer, is about 1.0 g/dm 2 or more.

Embodiment 5

The cured absorbent composite of a foregoing embodiment, formed as a glove with the open foam on the interior for absorbing user sweat.

Embodiment 6

A method of forming a highly absorbent composite comprising: forming a layer of foamed elastomer; mechanically converting the layer of foam elastomer from a foam structure including closed cell structure to a substantially more open cell structure; forming a layer of unfoamed polymer either prior to or after forming the foamed layer, wherein the unfoamed and foamed layers are integrally affixed to one another; and curing the foamed layer.

Embodiment 7

The cured absorbent composite of a embodiment 1 to 5, or the method of embodiment 6, wherein in the absence of mechanical conversion the water absorbancy of the foam layer would be about 50% or more lower.

Embodiment 8

The cured absorbent composite of embodiment 6 or the method of embodiment 6 or 7, wherein the composite is formed as a glove with the open foam on the interior for absorbing user sweat.

Embodiment 9

The cured absorbent composite of a embodiment 1 to 5, or the method of embodiment 6, wherein mechanically converting the layer of foam is effected by forming the foamed layer by dipping a former with a rough surface into foamed elastomer, the rough surface effective to so convert the foamed layer, optionally the former having a Ra of about 3 micron or more and/or a Rz of 20 micron or more.

Embodiment 10

The cured absorbent composite of embodiment 9, or the method of embodiment 9, wherein in the absence of mechanical conversion the water absorbancy of the foam layer would be about 50% or more lower.

Embodiment 11

The method of embodiment 9 or 10, wherein the composite is formed as a glove with the open foam on the interior for absorbing user sweat.

Embodiment 12

The cured absorbent composite of a embodiment 9-11 or the method of a embodiment 9-11, wherein the foamed elastomer used to form the foamed elastomer layer has about 50-60% density with a viscosity of about 450-500 cps.

Embodiment 13

The cured absorbent composite of embodiment 9 or 12 or the method of embodiment 9 or 12, wherein the foamed elastomer is NBR with a acrylonitrile content of 38 to 42% wt.

Embodiment 14

The cured absorbent composite of a embodiment 1 to 5, or the method of embodiment 6, wherein mechanically converting the layer of foam is effected by applying a fibrous flock to the layer.

Embodiment 15

The cured absorbent composite of embodiment 14, or the method of embodiment 14, wherein in the absence of mechanical conversion the water absorbancy of the foam layer would be about 60% or more lower.

Embodiment 16

The cured absorbent composite of a embodiment 14 or 15, or the method of embodiment 14 or 15, wherein the composite is formed as a glove with the open foam on the interior for absorbing user sweat.

Embodiment 17

The cured absorbent composite of a embodiment 14-16 or the method of a embodiment 14-16, wherein the foamed elastomer used to form the foamed elastomer layer has about 40-45% density with a viscosity of about 400-450 cps.

Embodiment 18

The cured absorbent composite of a embodiment 14-17 or the method of a embodiment 14-17, wherein the foamed elastomer is NBR with a acrylonitrile content of 28 to 34% wt.

Embodiment 19

The cured absorbent composite of a embodiment 1 to 5, or the method of embodiment 6, wherein mechanically converting the layer of foam is effected by applying to the foamed layer micronized waxes, fillers, cationic starch powders, salt particles, solidified acid particles, or atomized coagulant salts or acids.

Embodiment 20

The cured absorbent composite of embodiment 19, or the method of embodiment 19, wherein in the absence of mechanical conversion the water absorbancy of the foam layer would be about 50% or more lower.

Embodiment 21

The cured absorbent composite of a embodiment 19 or 20, or the method of embodiment 19 or 20, wherein the composite is formed as a glove with the open foam on the interior for absorbing user sweat.

The foregoing description of embodiments of the invention comprises a number of elements, devices, machines, components and/or assemblies that perform various functions as described. These elements, devices, machines, components and/or assemblies are exemplary implementations of means for performing their respectively described functions.

Although only a few exemplary embodiments of the present invention have been described in detail above, those skilled in the art will readily appreciate that many modifications are possible in the exemplary embodiments without materially departing from the novel teachings and advantages of this invention.

The invention claimed is:

1. A method of forming a highly absorbent composite glove comprising:
    dip forming a layer of foamed elastomer on a former with a rough surface, wherein the former has a Ra of about 3 micron or more, thereby mechanically converting the layer of foam elastomer from a foam structure including closed cell structure to a substantially more open cell structure;
    forming a layer of unfoamed polymer, wherein the unfoamed and foamed layers are integrally affixed to one another;
    curing the foamed layer to form the glove, wherein in the absence of mechanical conversion the water absorbancy of the foam layer would be about 60% or lower than occurs with mechanical conversion; and
    configuring the gloves for use by the consumer with the open foam on the interior for absorbing user sweat, wherein sweat absorption is due to the foamed, cured elastomer.

2. The method of claim 1, wherein the moisture absorption capacity of the cured foamed layer, normalized to a thickness of 0.275 mm for the absorptive layer, is about 0.6 $g/dm^2$ or more.

3. The method of claim 2, wherein the former has a Rz of 20 micron or more.

4. The method of claim 2, wherein the foamed elastomer used to form the foamed elastomer layer has about 50-60% density with a viscosity of about 450-500 cps.

5. The method of claim 4, wherein the foamed elastomer is NBR with a acrylonitrile content of 38 to 42% wt.

6. The method of claim 1, wherein forming the layer of foamed elastomer comprises dipping a former, with or without elastomer coatings, into foamed elastomer.

7. The method of claim 6, wherein the foamed elastomer used to form the foamed elastomer layer has a foam density ranging from 30-60% and a viscosity ranging from 300 to 500 cps.

* * * * *